United States Patent
Davis (10) Patent No.: US 12,440,405 B2
(45) Date of Patent: Oct. 14, 2025

(54) MOBILITY VEHICLE

(71) Applicant: Pride Mobility Products Corporation, Duryea, PA (US)

(72) Inventor: Jonathan Davis, Nanticoke, PA (US)

(73) Assignee: Pride Mobility Products Corporation, Duryea, PA (US)

( * ) Notice: Subject to any disclaimer, the term of this patent is extended or adjusted under 35 U.S.C. 154(b) by 0 days.

(21) Appl. No.: 18/781,710

(22) Filed: Jul. 23, 2024

(65) Prior Publication Data

US 2024/0374444 A1   Nov. 14, 2024

Related U.S. Application Data

(63) Continuation of application No. 17/877,191, filed on Jul. 29, 2022, now Pat. No. 12,076,284, which is a
(Continued)

(51) Int. Cl.
*A61G 5/10*     (2006.01)
*A61G 5/04*     (2013.01)
(Continued)

(52) U.S. Cl.
CPC ............ *A61G 5/1078* (2016.11); *A61G 5/047* (2013.01); *A61G 5/1089* (2016.11); *B60G 3/145* (2013.01);
(Continued)

(58) Field of Classification Search
CPC .... A61G 5/1078; A61G 5/047; A61G 5/1089; A61G 5/045; B60G 3/145; B60G 21/045;
(Continued)

(56) References Cited

U.S. PATENT DOCUMENTS 5,727,802 A * 3/1998 Garven, Jr. .......... A61G 5/1097
                                                280/283
5,772,237 A * 6/1998 Finch .................. B60G 21/023
                                                280/43.23
(Continued)

FOREIGN PATENT DOCUMENTS

CN          201834132 U      5/2011
CN          202022067 U     11/2011
(Continued)

OTHER PUBLICATIONS

International Search Report and Written Opinion dated Sep. 13, 2018, for International Patent Application No. PCT/US2018/041008, 8 pages.
(Continued)

*Primary Examiner* — Paul N Dickson
*Assistant Examiner* — Shams Dhanani
(74) *Attorney, Agent, or Firm* — Morgan, Lewis & Bockius LLP (57) ABSTRACT

A mobility vehicle may comprise a frame, a first pivot arm, a second pivot arm, and a suspension assembly. The first pivot arm may be coupled to the frame and coupled to a drive wheel. The second pivot arm may be coupled to the frame and coupled to a ground engaging caster wheel. The suspension assembly may be coupled to the frame. The suspension assembly may include a first spring assembly and a second spring assembly. The first spring assembly may be disposed about a first spring axis and coupled to the first pivot arm. The second spring assembly may be disposed about a second spring axis and coupled to the second pivot arm. The first spring axis and the second spring axis may be disposed relative to each other at an angle of no greater than about 150° when the mobility vehicle is operating on horizontal ground.

19 Claims, 9 Drawing Sheets

Related U.S. Application Data continuation of application No. 17/256,760, filed as application No. PCT/US2018/041008 on Jul. 6, 2018, now Pat. No. 11,419,774.

(51) Int. Cl.
*B60G 3/14* (2006.01)
*B60G 21/045* (2006.01)

(52) U.S. Cl.
CPC ...... *B60G 21/045* (2013.01); *B60G 2204/421* (2013.01); *B60G 2300/24* (2013.01)

(58) Field of Classification Search
CPC .......... B60G 2204/421; B60G 2300/24; B60Y 2200/84; B60B 33/00; B60B 33/045; B62K 5/01; B62K 25/04; B62K 2202/00; B62H 1/12
See application file for complete search history.

(56) References Cited

U.S. PATENT DOCUMENTS

| | | | | |
|---|---|---|---|---|
| 5,944,131 | A * | 8/1999 | Schaffner | A61G 5/043 |
| | | | | 180/907 |
| 6,129,165 | A * | 10/2000 | Schaffner | A61G 5/125 |
| | | | | 180/907 |
| 6,206,119 | B1 * | 3/2001 | Wu | A61G 5/1078 |
| | | | | 180/907 |
| 6,273,212 | B1 * | 8/2001 | Husted | A61G 5/1054 |
| | | | | 180/907 |
| 6,345,833 | B2 * | 2/2002 | Melgarejo | A61G 5/125 |
| | | | | 280/755 |
| 8,113,531 | B2 | 2/2012 | Zhou et al. | |
| 11,066,283 | B2 * | 7/2021 | Chow | B65G 1/0492 |
| 2005/0206149 | A1 | 9/2005 | Mulhern et al. | |
| 2006/0076747 | A1 | 4/2006 | Pauls et al. | |
| 2006/0086554 | A1 | 4/2006 | Jackson et al. | |
| 2007/0023209 | A1 * | 2/2007 | Wu | A61G 5/043 |
| | | | | 280/755 |
| 2008/0056985 | A1 | 3/2008 | Zhao et al. | |
| 2009/0145677 | A1 | 6/2009 | Zhou | |
| 2011/0253464 | A1 | 10/2011 | Chen | |
| 2012/0080244 | A1 | 4/2012 | Hou | |
| 2013/0207364 | A1 | 8/2013 | Bekoscke et al. | |
| 2013/0306383 | A1 | 11/2013 | Mulhern et al. | |
| 2013/0328282 | A1 | 12/2013 | Porcheron | |
| 2015/0014070 | A1 | 1/2015 | Mirzaie | |
| 2015/0053490 | A1 | 2/2015 | Santagata | |
| 2016/0074263 | A1 | 3/2016 | Wu | |
| 2017/0056261 | A1 | 3/2017 | Vereen, III et al. | |
| 2017/0281436 | A1 | 10/2017 | Kalf et al. | |
| 2021/0052444 | A1 * | 2/2021 | Diamond | B60B 33/0018 |

FOREIGN PATENT DOCUMENTS

| | | |
|---|---|---|
| CN | 202242852 U | 5/2012 |
| CN | 107072858 A | 8/2017 |
| DE | 102016118037 A1 | 3/2018 |
| GB | 2520036 A | 5/2015 |
| TW | 201043216 A1 | 12/2010 |
| WO | 9846184 A1 | 10/1998 |

OTHER PUBLICATIONS

Office Action for corresponding Canadian Serial No. 3,104,625 dated Jun. 17, 2022, 7 pages.
Office Action for corresponding Chinese Application No. 201880095315.5 issued May 27, 2022, 15 pages.
Extended European Search Report for European Patent Application No. 18925435.2, dated Jan. 28, 2022, 10 pages.
Australian Examination Report No. 1 for AU 2018431022, dated Jun. 23, 2021, 4 pages.
Communication issued in corresponding European Patent Application No. 18925435.2 dated Jun. 15, 2023, 5 pages.
Chinese Office Action, dated Jan. 11, 2023, for the corresponding Chinese Patent Application No. 201880095315.5, 5 pages.

* cited by examiner

MOBILITY VEHICLE

CROSS REFERENCE TO RELATED APPLICATIONS

This application is a Continuation of U.S. patent application Ser. No. 17/877,191 filed Jul. 29, 2022, which is a Continuation of U.S. patent application Ser. No. 17/256,760 filed Dec. 29, 2020, issued as U.S. Pat. No. 11,419,774, which is a U.S. National Stage of International Application No. PCT/US2018/041008 filed on Jul. 6, 2018, entitled "Mobility Vehicle", each of which is incorporated herein in its entirety for all purposes.

BACKGROUND OF THE INVENTION

The present invention generally relates to a mobility vehicle and, more particularly, to a mobility vehicle having a suspension assembly.

BRIEF SUMMARY OF THE INVENTION

In one embodiment, a mobility vehicle comprises a frame, a first pivot arm coupled to the frame and coupled to a drive wheel, a second pivot arm coupled to the frame and coupled to a ground engaging caster wheel, and a suspension assembly coupled to the frame. The suspension assembly may include a first spring assembly, disposed about a first spring axis, and coupled to the first pivot arm; and a second spring assembly, disposed about a second spring axis, and coupled to the second pivot arm. The first spring axis and the second spring axis may be disposed relative to each other at an angle of no greater than about 150 degrees when the mobility vehicle is operating on horizontal ground.

The first pivot arm may include an anti-tip element. The first pivot arm is configured and dimensioned to cause the anti-tip element to move relative to a drive wheel axis when the first pivot arm pivots. The first pivot arm may be coupled to the frame at a first rod extending from a left side of the frame to a right side of the frame and the second pivot arm may be coupled to the frame at a second rod extending from the left side of the frame to the right side of the frame, each of the first rod and second rod fixedly attached to the frame in a configuration to stiffen the frame. The first axis may be closer to horizontal than the second spring axis.

In a further embodiment, the mobility vehicle may include a stiffening bridge disposed from the first rod to the second rod. The stiffening bridge may be an outermost point of the frame. The second pivot arm may include a first substantially linear arm segment extending at least from a point at which the second pivot arm may be coupled to the frame through a point at which the second pivot arm may be coupled to the second spring assembly. The second pivot arm may include a second arm segment extending from the linear arm segment to at least a caster stem axis. The second spring axis may be approximately normal to the first substantially linear segment when the mobility vehicle is on substantially horizontal ground. A horizontal projection of a first line may pass through a) a point at which the first spring assembly is coupled to the frame and b) a point at which the second spring assembly is coupled to the frame may intersect a horizontal projection of a second line passing through c) a point at which the first spring assembly is coupled to the first pivot arm and d) a point at which the second spring assembly is coupled to the second pivot arm.

The intersection of the horizontal projection of the first line and the horizontal projection of the second line may be closer to the first pivot arm than the second pivot arm. At least one of the first spring assembly and the second spring assembly may include a spring disposed about co-axial damper. A center of gravity of the mobility vehicle may be positioned approximately at the midpoint between a vertical line passing through a point at which the first spring assembly is coupled to the frame and a vertical line passing through a point at which the second spring assembly is coupled to the frame.

BRIEF DESCRIPTION OF THE SEVERAL VIEWS OF THE DRAWINGS

The foregoing summary, as well as the following detailed description of embodiments of the mobility vehicle, will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE INVENTION

Referring to the drawings in detail, wherein like reference numerals indicate like elements throughout, there is shown in FIGS. 1-7 a mobility vehicle, generally designated 20, in accordance with an exemplary embodiment of the present invention. In some embodiments, the mobility vehicle is a wheelchair.

In some embodiments, the mobility vehicle 20 includes a frame 22. Frame 22 may be a two-piece welded frame. In one embodiment, frame 22 includes a left side 22a and a right side 22b. Frame 22 may further comprise a three-sided box frame having a bottom panel (e.g., formed of left side 22a and right side 22b), a left panel 23a and a right panel 23b. In one embodiment, left panel 23a and the left side 22a of a bottom panel are a single continuous material. In some embodiments, right panel 23b and right side 22b are of a single continuous material. In some embodiments bottom panel 21 includes front panel 21a and rear panel 21b. In some embodiments, front panel 21a and rear panel 21b are separated by a gap 21c. In some embodiments, one or more drive wheels 24 are coupled to the frame 22. In some embodiments, a motor 26 is coupled to the drive wheel 24 to rotate the drive wheel 24 about a drive wheel axis 52. In some embodiments, the mobility vehicle 20 includes two drive wheels 24 with a motor 26 coupled to each of the drive wheels 24 such that each drive wheel is controllable independently of the other drive wheel 24. In some embodiments, the motor is a brushed DC motor (e.g., a Linix 2-pole motor) with single-stage gear box.

The motor 26, in some embodiments, is connected to a controller (not show) configured to receive an input from a user (e.g., via a joystick, sip and puff controller, or voice command). In some embodiments, the controller is configured to send a signal to the motor 26 in response to receiving a signal from the user to move the mobility vehicle 20. In some embodiments, the mobility vehicle 20 does not include a motor and the drive wheels are manually powered (e.g., rotating wheel by hand or turning a crank coupled to the drive wheel).

Figure 1:
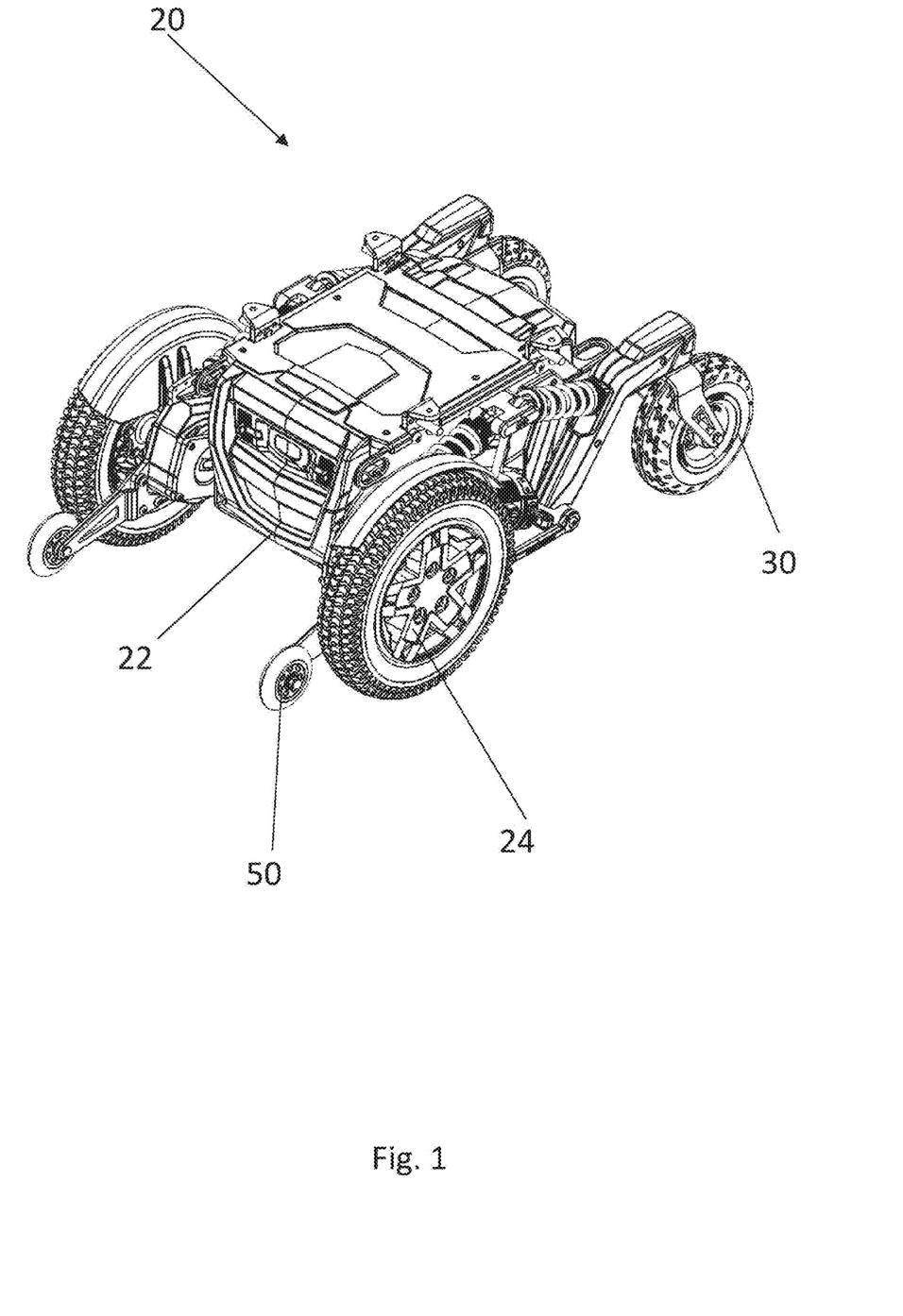
FIG. 1 is a perspective view of a mobility vehicle in accordance with an exemplary embodiment of the present invention.
Figure 2:
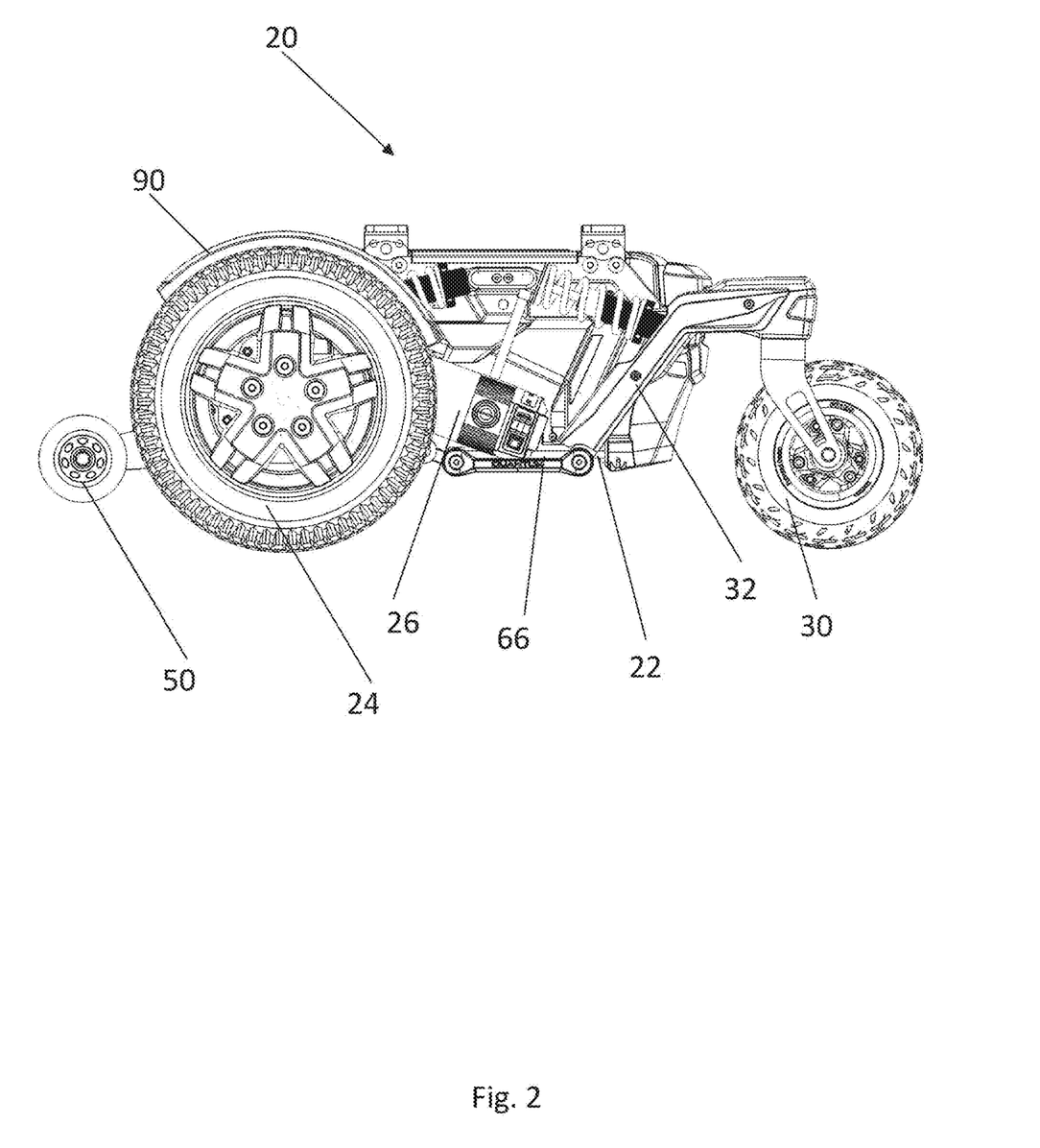
FIG. 2 is a right-side view of the mobility vehicle of FIG. 1 with some elements removed.
Figure 3:
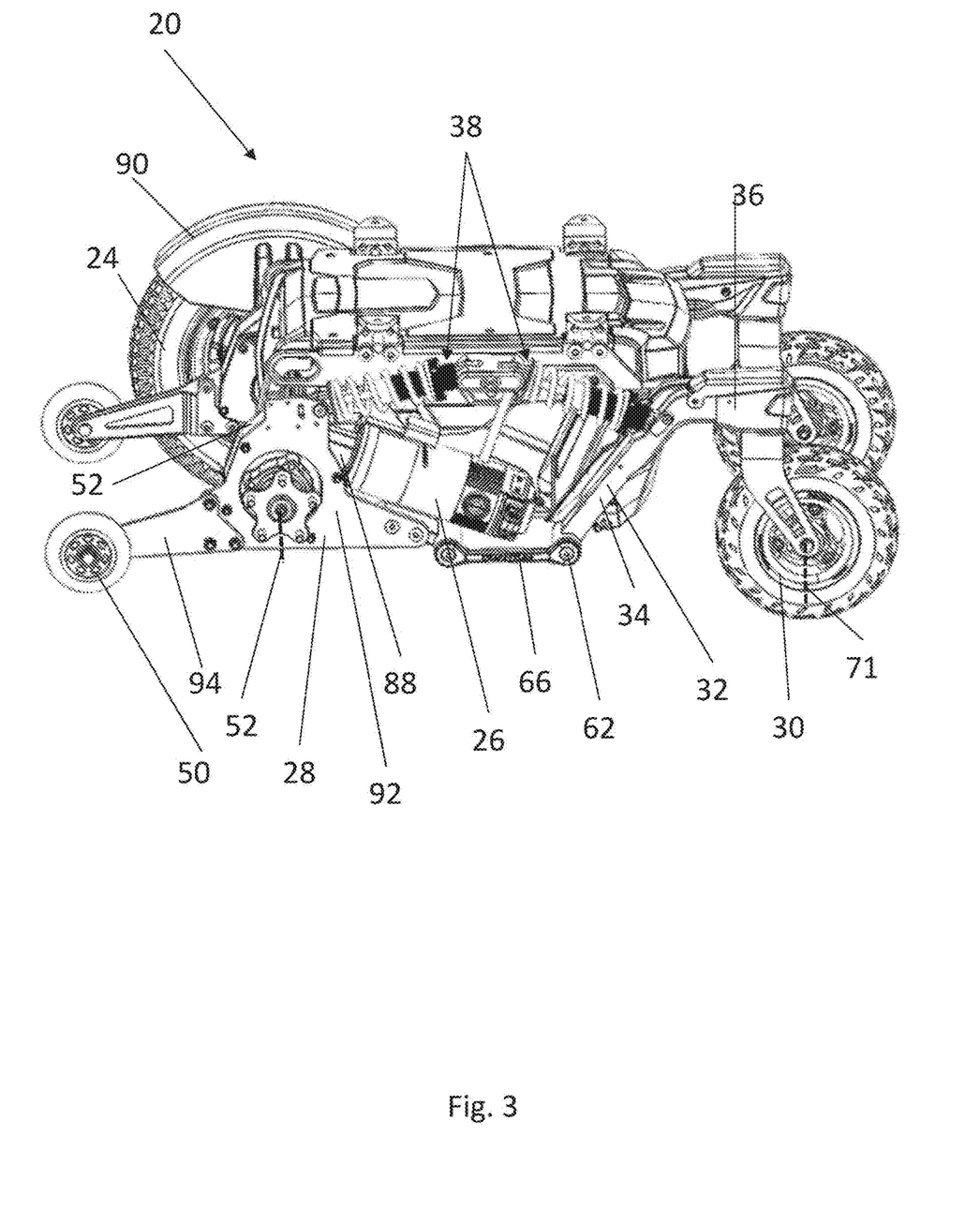
FIG. 3 is a top, right-side perspective view of the mobility vehicle of FIG. 1 with some elements removed.
Figure 4:
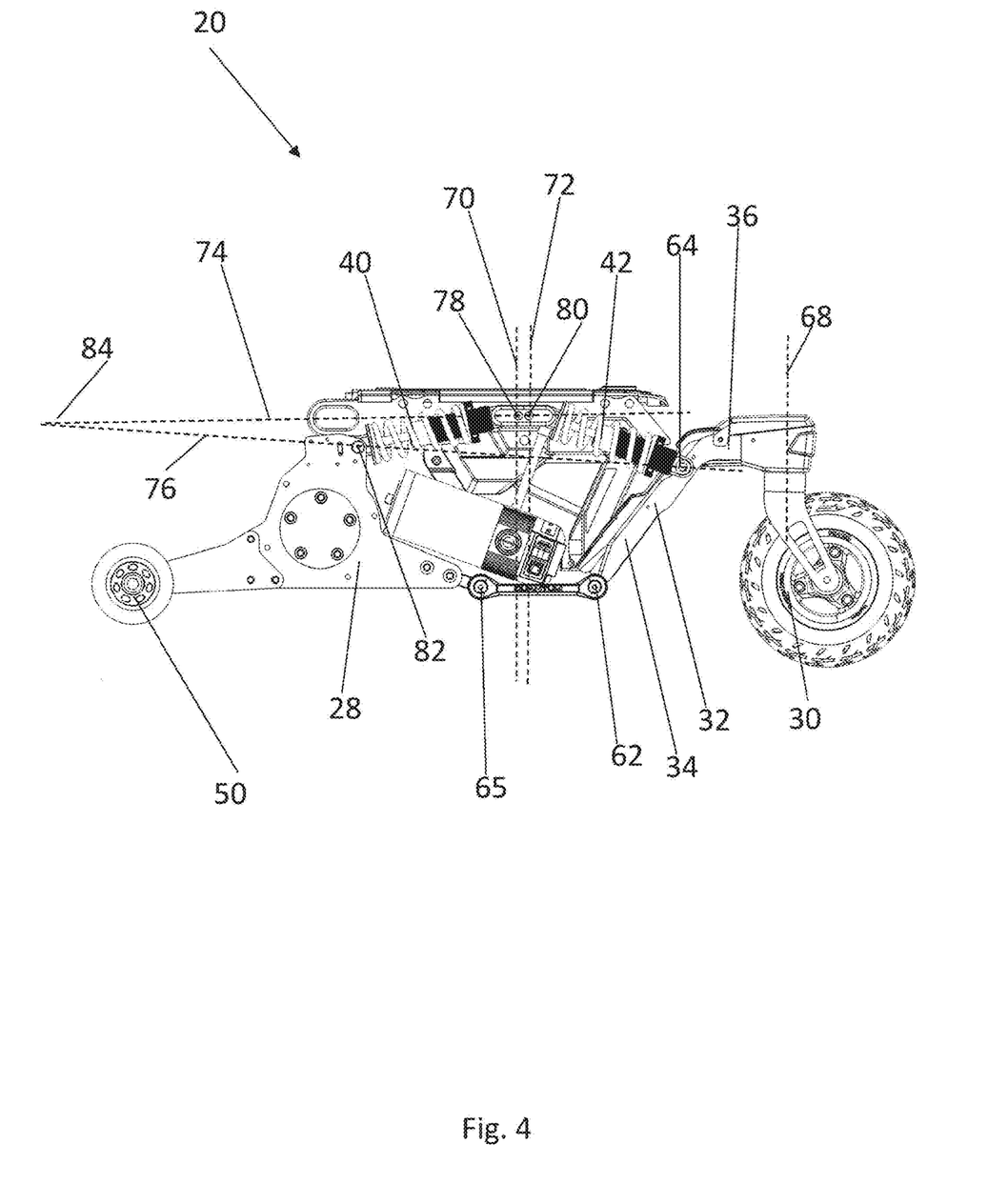
FIG. 4 is right-side view of the mobility vehicle of FIG. 1 with some elements removed.
Figure 5:
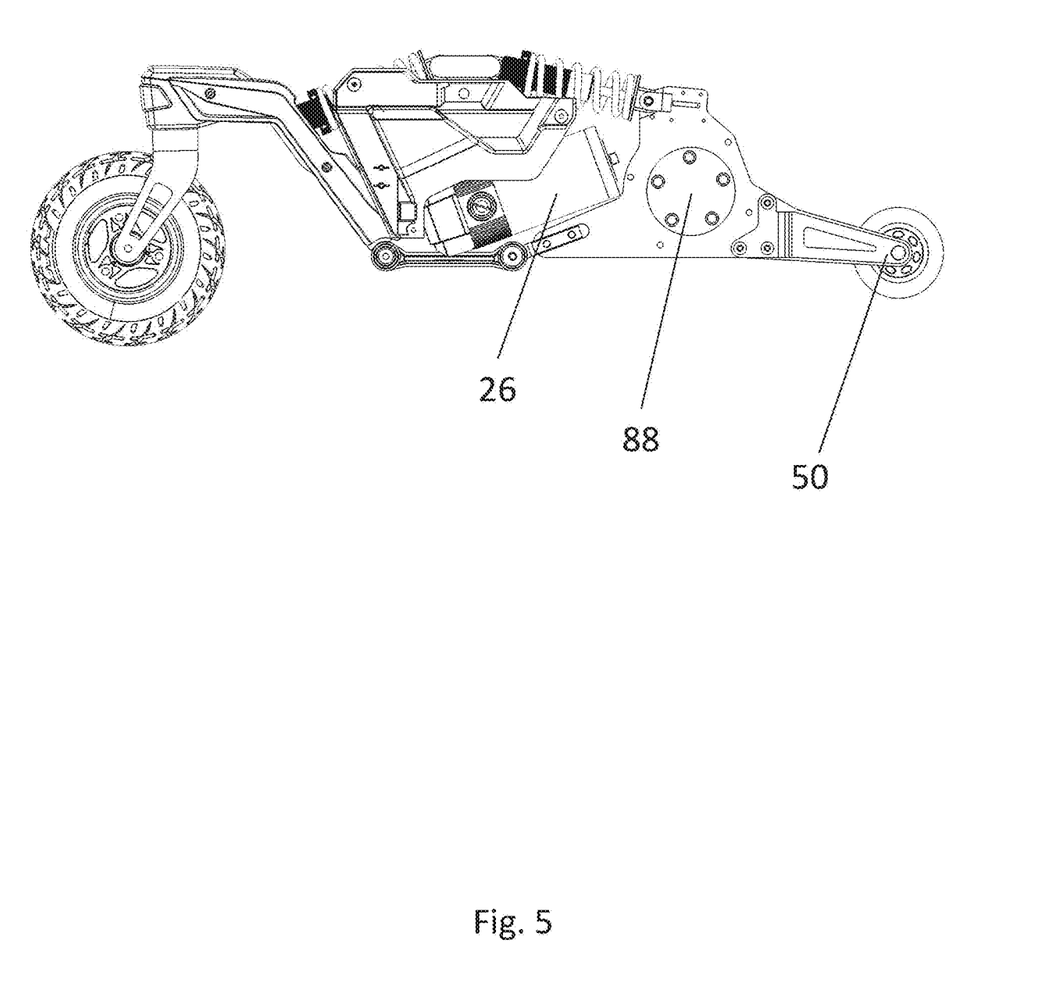
FIG. 5 is a right-side view of the mobility vehicle of FIG. 1 with some elements removed.

Referring to FIGS. 3-4, the mobility vehicle 20 is shown with a drive wheel 24 removed for ease of discussion. In some embodiments, a first pivot arm 28 is coupled to the frame 22 and the drive wheel 24. In some embodiments, the first pivot arm 28 is movably coupled to the frame 22. In some embodiments, the first pivot arm 28 is pivotable relative to the frame 22. In some embodiments, the first pivot arm 28 can pivot relative to the frame 22 about a point 65 where the first pivot arm 28 is coupled to the frame 22. In some embodiments, the first pivot arm 28 can pivot relative to the frame 22 to account for uneven terrain (e.g., by maintaining a seat in a generally horizontal orientation) and provide a smoother ride for a user of the mobility vehicle 20 than a mobility vehicle that does not include a first pivot arm.

In some embodiments, the length of the first pivot arm 28, and thus the distance of the drive wheel 24 to a midpoint of the mobility vehicle 20, can be selected to provide stability to the mobility vehicle 20 (e.g., a longer distance may provide a more stable mobility vehicle). In some embodiments, the length of the first pivot arm 28 is selected to provide a mobility vehicle with a relatively small footprint. In some embodiments, the first pivot arm 28 is coupled to a gear box 88 and the gear box 88 is coupled to the motor 26. In some embodiments, gear box 88 is a single stage gear box. In some embodiments, gear box 88 includes an axle coupled to drive wheel 24 to rotate the drive wheel. In some embodiments, fender 90 is coupled to the first pivot arm 28 to prevent unintended contact between drive wheel 24 and foreign objects.

In some embodiments, the first pivot arm 28 includes an anti-tip element 50 (e.g., a wheel). In some embodiments, drive wheel 24 is positioned between the anti-tip element 50 and the midpoint of the mobility vehicle 20. In some embodiments, the anti-tip element 50 is configured to be positioned to avoid contact with the ground when the mobility vehicle 20 is on a horizontal ground surface. In some embodiments, the first pivot arm 28 is configured and dimensioned to cause the anti-tip element 50 to move relative to the drive wheel axis 52 when the first pivot arm 28 pivots relative to frame 22. In some embodiments, the anti-tip element 50 is detachably coupled to the first pivot arm 28 (e.g., via a threaded connector, magnet, or rivet).

In some embodiments, the first pivot arm 28 includes a first plate 92 and a second plate 94 coupled to the first plate 92 (FIG. 3). In some embodiments, first plate 92 and second plate 94 are a unitary construct. In some embodiments, the first plate 92 is configured to be coupled to the gear box 88 and the second plate 94 is configured to be coupled to the anti-tip element 50. In some embodiments, the orientation of the second plate 94 to the first plate 92 is adjustable.

In some embodiments, the mobility vehicle 20 includes a caster wheel 30 configured to rotate about a caster stem axis 68 (FIG. 4) and caster axis 71. In some embodiments, the caster wheel 30 is configured to engage the ground during operation of the mobility vehicle 20. In some embodiments, a second pivot arm 32 is coupled to the frame 22 and the caster wheel 30. In some embodiments, the second pivot arm 32 is pivotable relative to the frame 22 about a point 62 (FIG. 4) where the second pivot arm 32 is coupled to the frame 22. In some embodiments, second pivot arm 32 is pivotable relative to the frame 22 independently of first pivot arm 28. In some embodiments, mobility vehicle 20 includes a plurality of caster wheels 30 and second pivot arms 32. In some embodiments, each of the plurality of caster wheels 30 and second pivot arms 32 are pivotable independently of another of the plurality of caster wheels 30 and second pivot arms 32.

Figure 7:
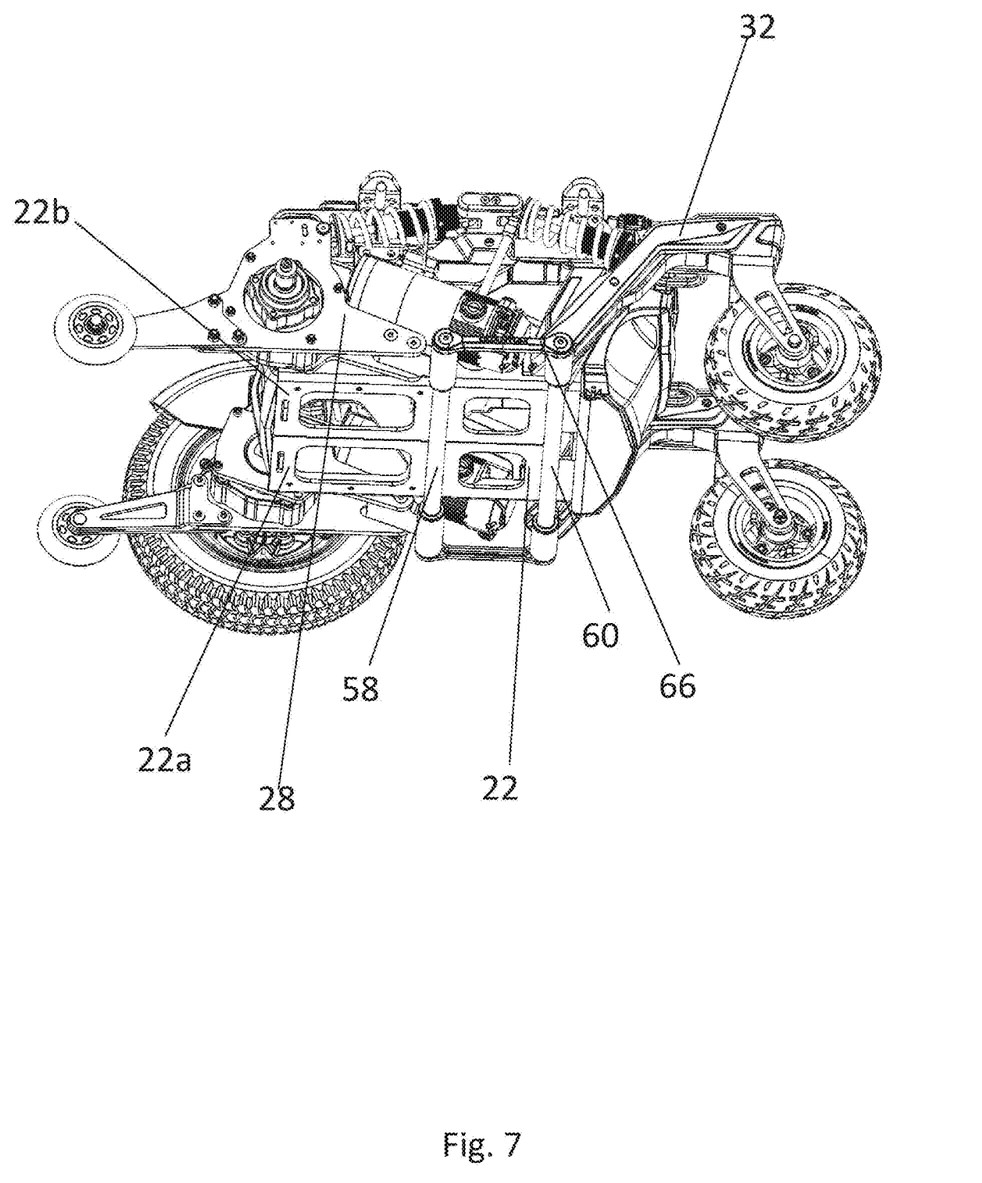
FIG. 7 is a bottom perspective view of the mobility vehicle of FIG. 1.
Figure 8:
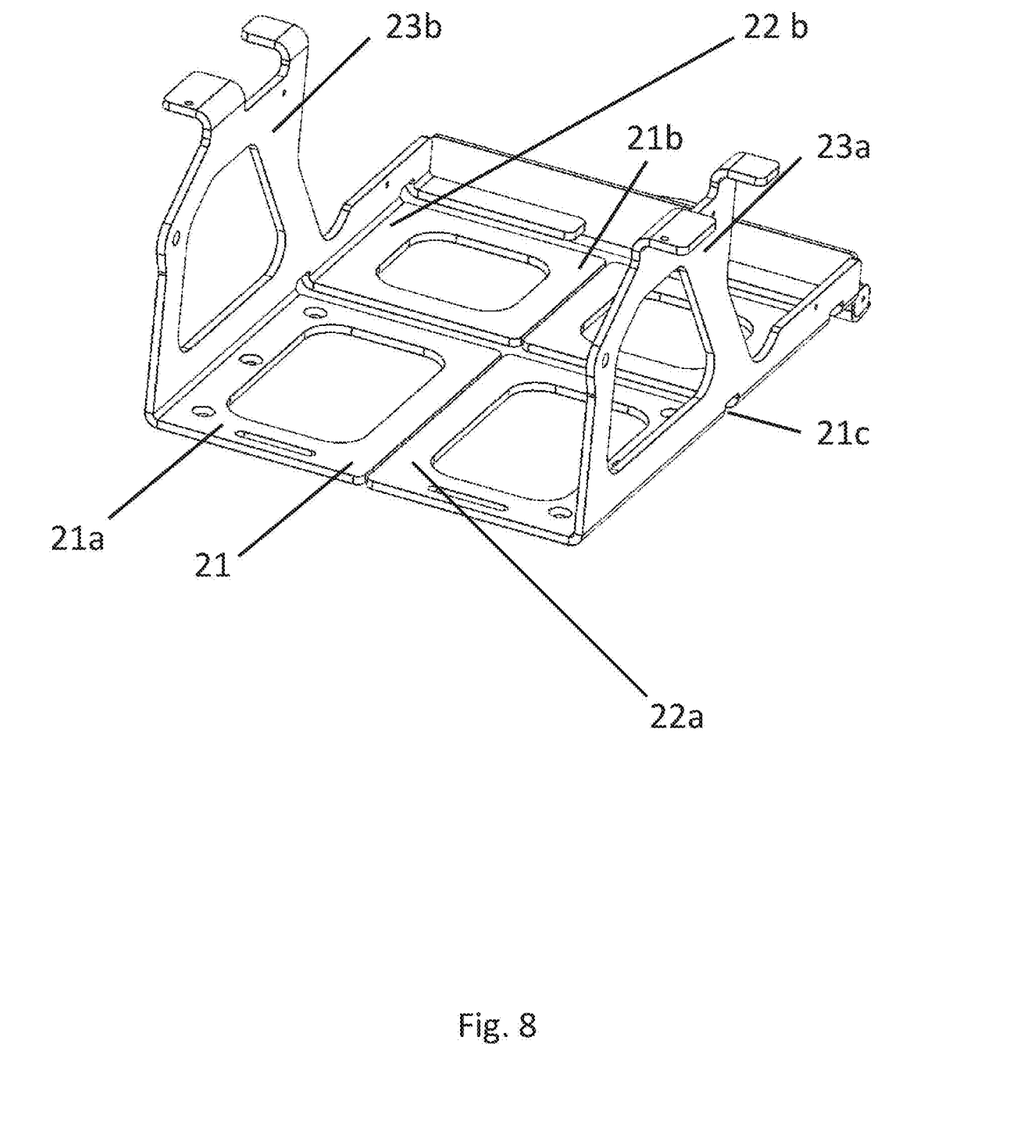
FIG. 8 is a perspective view of and exemplary frame 22, in an exemplary embodiment of the present invention.

In some embodiments, the first pivot arm 28 is coupled to the frame 22 at a first rod 58 (FIG. 7). In some embodiments, the first rod 58 extends from a right side of frame 22 to a left side of frame 22. In some embodiments, the first pivot arm 28 on the left side of the mobility vehicle 20 and the first pivot arm 28 on the right side of the mobility vehicle 20 are each coupled to the first rod 58. In some embodiments, the first rod 58 is fixed relative to the frame 22 such that the first rod 58 does not rotate as the first pivot arm 28 rotates relative to the frame 22.

In some embodiments, second pivot arm 32 is coupled to frame 22 at a second rod 60. In some embodiments, second rod 60 extends from a right side of frame 22 to a left side of frame 22. In some embodiments, the second pivot arm 32 on the left side of the mobility vehicle 20 and the second pivot arm 32 on the right side of the mobility vehicle 20 are each coupled to the second rod 60. In some embodiments, the second rod 60 is fixed relative to the frame 22 such that the second rod 60 does not rotate as the second pivot arm 32 rotates relative to the frame 22. In some embodiments, at least one of first rod 58 and second rod 60 are fixedly attached to the frame 22 (e.g., via welding) in a configuration to stiffen the frame 22. In some embodiments, first rod 58 and second rod 60 are coupled to frame 22 such that the longitudinal axis of each rod 58, 60 is below a bottom panel of frame 22. In some embodiments, a bridge 66 (e.g., stiffening bridge) is disposed from first rod 58 to second rod 60. In some embodiments, the bridge 66 is an outermost point of the frame 22. In some embodiments, the bridge 66 and first pivot arm 28 are co-planar. In some embodiments, bridge 66 is configured to provide a distinctive ornamental shape.

In some embodiments, the mobility vehicle 20 includes a suspension assembly 38. In some embodiments, suspension assembly 38 is coupled to frame 22. In some embodiments, suspension assembly 38 includes at least one of a shock, a damper, or a coil-over configuration. In some embodiments, suspension assembly 38 includes a first spring assembly 40 and a second spring assembly 42. In some embodiments, the first spring assembly 40 is coupled to the first pivot arm 28 (e.g., via threaded anchor, dowel, or axle). In some embodiments, first spring assembly 40 is coupled to first pivot arm 28 in a rotatable or pivotable configuration. First spring assembly 40 may be rotatable relative to the first pivot arm 28. In some embodiments, the second spring assembly 42 is coupled to the second pivot arm 32 (e.g., via threaded anchor, dowel, or axle). In some embodiments, second spring assembly 42 is coupled to second pivot arm 32 in a rotatable or pivotable configuration (e.g., such that it is rotatable or pivotable relative to second pivot arm 32). In some embodiments, at least one of the first spring assembly 40 and the second spring assembly 42 include a spring 54 disposed about a damper 56. In some embodiments, damper 56 has a linear damping rate. In some embodiments, damper 56 has a damping rate that is light (e.g., approximately 1 to 1.5 lbf·s/in) in compression and medium-light (e.g., approximately 12 to 18 lbf·s/in) in rebound. In some embodiments, spring 54 and damper 56 are co-axial. In some embodiments, spring 54 is disposed co-axially about damper 56.

Figure 9:
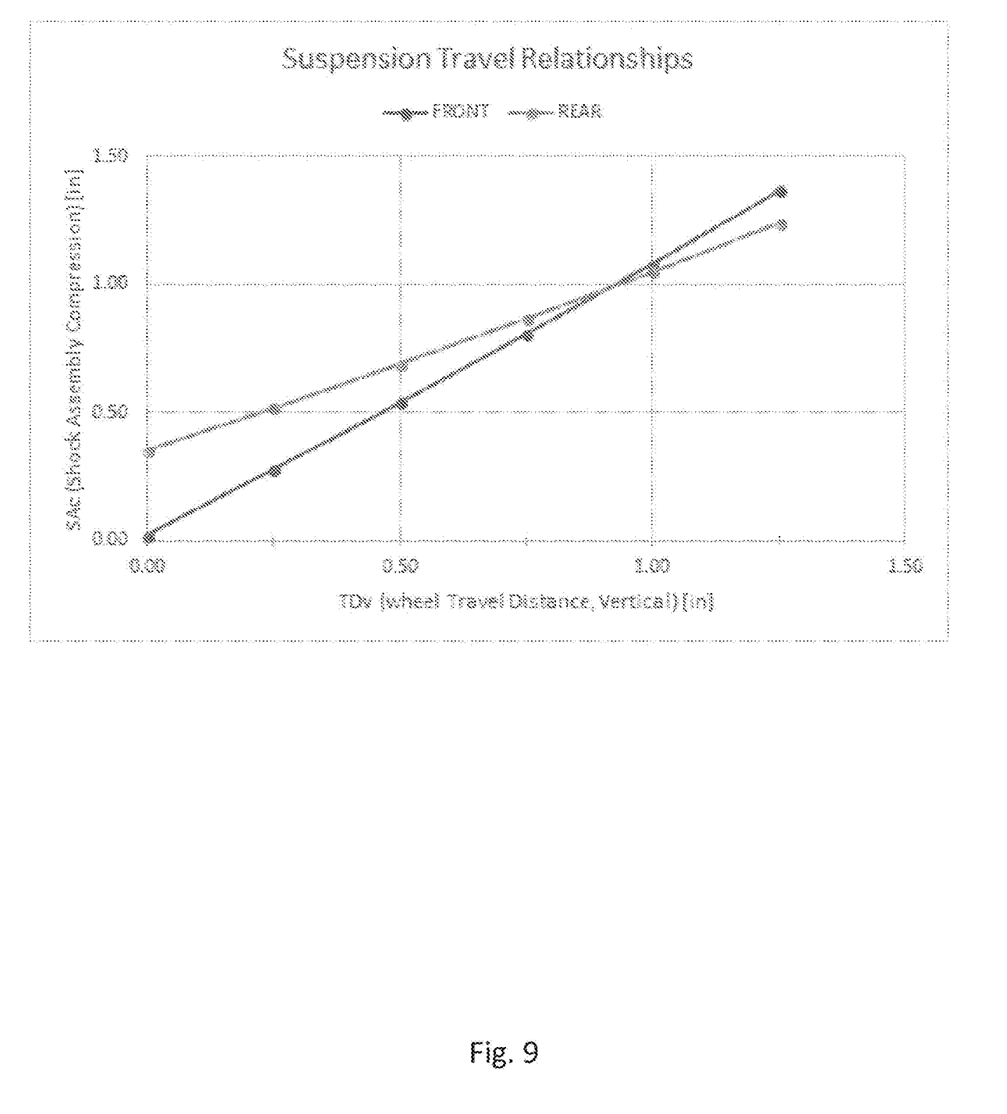
FIG. 9 is a graph illustrating exemplary vertical travel distance of front and rear wheels pivoting relative to a frame versus shock compression distance.

In some embodiments, a ratio of the vertical travel distance, relative to the frame, of drive wheel 24 and/or caster wheel 30 to a respective one of first spring assembly 40 and the second spring assembly 42 about 1:1. In some embodiments the foregoing ratio is substantially linear throughout the entire movement of one or more of the drive wheel(s) and/or caster wheel(s). FIG. 9 illustrates an embodiment of the foregoing ratios of drive wheel 24 (v. first spring assembly 40) and caster wheel 30 (v. second spring assembly 42). In some embodiments, as illustrated in FIG. 9, one of spring assembly is configured to produce a stiffer response than another spring assembly. As illustrated in FIG. 9, second spring assembly 42 is configured to produce a stiffer response to the vertical movement of caster wheel 30 than first spring assembly 40 produces in response to vertical movement of drive wheel 24. This differential in stiffness performance may be true even where second spring assembly 42 and first spring assembly 40 as substantially identical. The difference in such case being attributed to the configuration of the respective spring assemblies as they are coupled to their respective pivot assemblies. In some embodiments, the ratio of vertical travel distance, $TD_V$, of a first pivotable wheel (e.g., drive wheel 24 or caster wheel 30) relative to frame 22 as the pivotable wheel pivots about the frame (e.g., about point 65 or 62 respectively) to compression of a respective spring assembly (e.g., spring assembly 40 or 42 respectively), $SA_C$, is about 1:1. In some embodiments, the ratio of $TD_V{:}SA_C$ is about 3:4. In some embodiments, the ratio $TD_V{:}SA_C$ is different from front pivot wheel/spring assembly combinations than for rear pivot wheel/spring assembly combinations. In some embodiments, $TD_V{:}SA_C$ for one or both of front or rear wheel/spring assemblies is about 0.5:1; about 0.6:1; about 0.7:1; about 0.8:1; about 0.9:1; about 1.1:1; about 1.2:1 or about 1.3:1. In some embodiments, $TD_V{:}SA_C$ for one or both of front or rear wheel/spring assemblies is up to 1.3:1; up to 1.2:1; up to 1.1:1; up to 1:1; up to 0.9:1. In some embodiments, the first spring assembly 40 and/or second spring assembly 42 are configured to provide a consistent damping rate (e.g., the damping rate is substantially constant throughout the travel length of the respective pivot wheel) through movement of the drive wheel 24 or caster wheel 30 along an arc.

Table 1 reproduced below, reflects performance of exemplary front suspension and rear suspension.

TABLE 1

| Front suspension | | | Rear suspension | | |
|---|---|---|---|---|---|
| Wheel Height Change (at the wheel) | Shock Length | Shock Compression | Wheel Height Change | Shock Length | Shock Compression |
| | 7.00 | | | 7.00 | |
| 0.00 | 6.98 | 0.02 | 0.00 | 6.65 | 0.35 |
| 0.25 | 6.72 | 0.28 | 0.25 | 6.48 | 0.52 |
| 0.50 | 6.46 | 0.54 | 0.50 | 6.31 | 0.69 |
| 0.75 | 6.19 | 0.81 | 0.75 | 6.13 | 0.87 |
| 1.00 | 5.92 | 1.08 | 1.00 | 5.95 | 1.05 |
| 1.25 | 5.63 | 1.37 | 1.25 | 5.76 | 1.24 |
| (x) | | (y) | (x) | | (y) |
| | y = 1.08x + 0.01 | | | y = 0.71x + 0.34 | |

In some embodiments, the first spring assembly 40 or second spring assembly 42 have a maximum travel distance along the spring axis of about 1 inch, about 1.5 inches, about 2 inches, about 3 inches, about 4 inches, about 5 inches, or about 6 inches.

Figure 6:
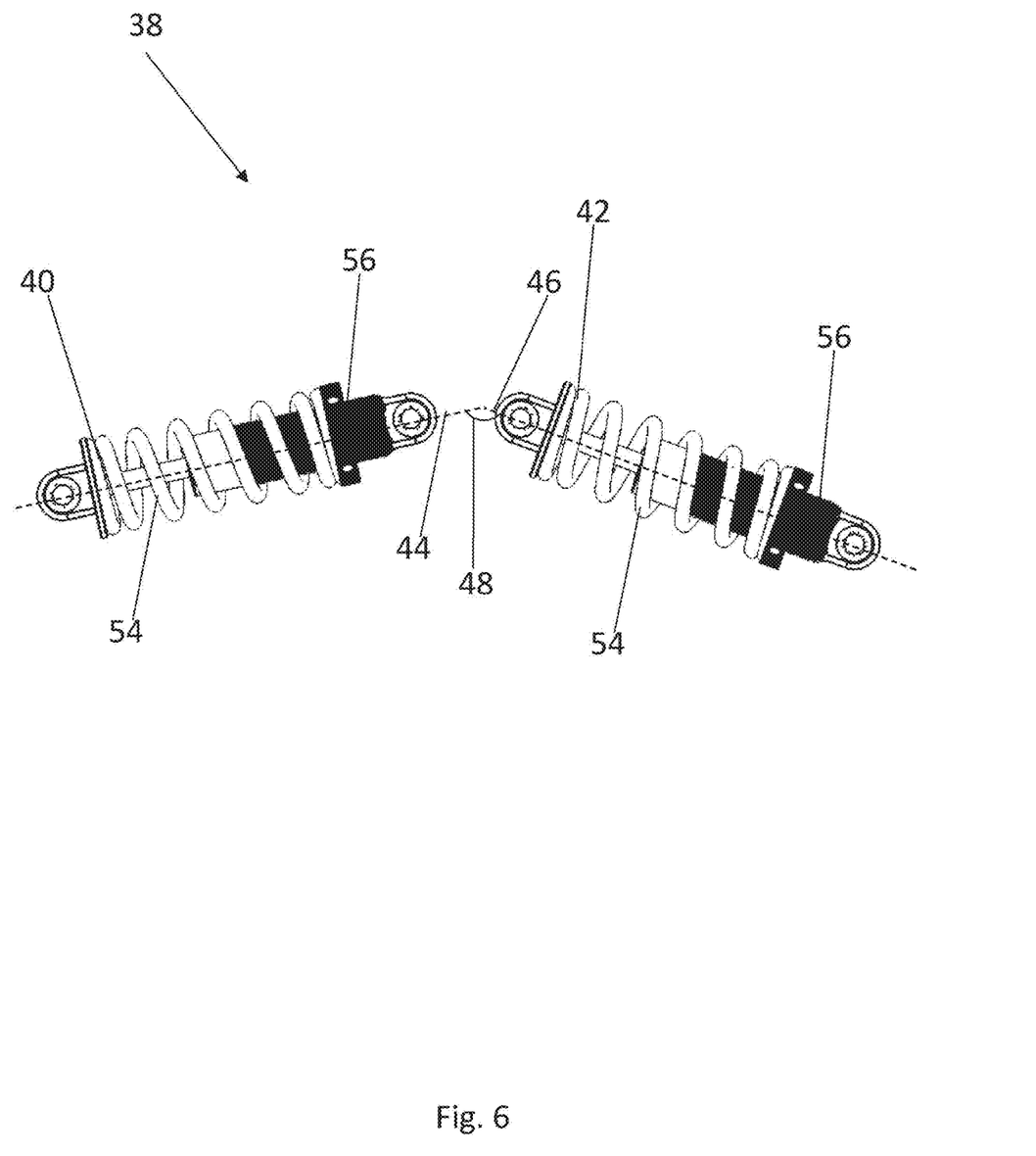
FIG. 6 is a right-side view of the first spring assembly and second spring assembly of the mobility vehicle of FIG. 1.

In some embodiments, the first spring assembly 40 is disposed about a first spring axis 44 and the second spring assembly 42 is disposed about a second spring axis 46 (FIG. 6). In some embodiments, the first spring axis 44 and the second spring axis 46 are disposed relative to each other at an angle 48 of about 90° to about 100°, about 100° to about 110°, about 110° to about 120°, about 120° to about 130°, about 130° to about 140°, about 140° to about 150°, about 150° to about 160°, about 160° to about 170°, about 170° to about 180°, no greater than 120°, no greater than 130°, no greater than 135°, no greater than 140°, no greater than 150°, no greater than 160°, no greater than 170°, or no greater than 180°. In some embodiments, the first spring axis 44 is closer to horizontal than the second spring axis 46. In some embodiments, the second spring axis 46 is closer to horizontal than the first spring axis 44.

In some embodiments, the second pivot arm 32 includes a first arm segment 34 and a second arm segment 36 (FIG. 4). In some embodiments, the first arm segment 34 is substantially linear. In some embodiments, the first arm segment 34 extends at least from a point 62 where the second pivot arm 32 is coupled to frame 22 through a point 64 where the second pivot arm 32 is coupled to the second spring assembly 42. In some embodiments, the second arm segment 36 extends at least from a point 64 where the second pivot arm 32 is coupled to the second spring assembly 42 to caster stem axis 68.

In some embodiments, the second arm segment 36 extends from the first arm segment 34 to at least a caster stem axis 68. In some embodiments, the second spring axis 46 is approximately normal to the first arm segment 34 when the mobility vehicle 20 is on substantially horizontal ground. In some embodiments, second spring axis 46 is substantially tangent to an arc that would be formed by the translation of point 64 pivoting about point 62. In some embodiments, second spring axis 46 is at an angle with the tangent to an arc that would be formed by the translation of point 64 pivoting about point 62. In some embodiments the formed angle is up to 5 degrees, up to 10 degrees, up to 15 degrees, about 1 degree, about 2 degrees, about 5 degrees, about 10 degrees or about 15 degrees.

In some embodiments, a center of gravity of the mobility vehicle 20 (with the user seated on the completed vehicle) is positioned approximately at a midpoint between a vertical line 70 passing through a point 78 at which the first spring assembly 40 is coupled to frame 22 and a vertical line 72 passing through a point 80 at which the second spring assembly 42 is coupled to frame 22. In some embodiments, the center of gravity of the mobility vehicle 20 is positioned between line 70 and line 72 when the mobility vehicle 20 is on horizontal ground and the center of gravity is not between line 70 and line 72 when the mobility vehicle 20 is on an incline or decline.

In some embodiments, a horizontal projection of a first line 74 (e.g., as illustrated in FIG. 4) passes through point 78 and point 80. In some embodiments, a horizontal projection of a second line 76 passes through a point 82 at which the first spring assembly 40 is coupled to the first pivot arm 28 and point 64. In some embodiments, the horizontal projection of the first line 74 intersects the horizontal projection of the second line 76 at intersection 84. In some embodiments, intersection 84 is closer to the first pivot arm 28 than the second pivot arm 32. In some embodiments, an angle 86 between the horizontal projection of the first line 74 and the horizontal projection of the second line 76 is about 1°, about 5°, about 10°, about 20°, about 30°, about 40°, about 50°, about 0° to about 10°, about 10° to about 20°, about 20° to about 30°, or about 30° to about 40°.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

The invention claimed is:

1. A mobility vehicle comprising:
a frame having a bottom surface;
a stiffening assembly coupled to the bottom surface of the frame and having a stiffening axis extending from a left side of the frame to a right side of the frame;
a first pivot arm coupled to the stiffening assembly and to a drive wheel; and
a second pivot arm coupled to the stiffening assembly and a caster wheel,
wherein the first pivot arm and the second pivot arm are each pivotable relative to the stiffening assembly about respective pivot axes that are parallel to the stiffening axis.

2. The mobility vehicle of claim 1, wherein the stiffening assembly includes a plurality of stiffing members each stiffening member extending from the left side of the frame to the right side of the frame.

3. The mobility vehicle of claim 2, wherein the stiffening assembly includes a plurality of bridges each bridge coupled to each of the plurality of stiffening members.

4. The mobility vehicle of claim 3, wherein the plurality of stiffening members consists of two stiffening members and the plurality of bridges consists of two bridges.

5. The mobility vehicle of claim 2, wherein each of the plurality of stiffening members includes a rod extending from the left side of the frame to the right side of the frame.

6. The mobility vehicle of claim 1, further comprising:
a drive wheel suspension coupled to the first pivot arm and to the frame.

7. The mobility vehicle of claim 6, further comprising:
a castor wheel suspension coupled to the second pivot arm and to the frame.

8. The mobility vehicle of claim 7, further comprising:
a link fixed to an external face of the frame, wherein the drive wheel suspension and the castor wheel suspension are coupled to the link.

9. The mobility vehicle of claim 7, wherein the drive wheel suspension comprises:
a first spring assembly, disposed about a first spring axis, and coupled to the first pivot arm.

10. The mobility vehicle of claim 9, wherein the castor wheel suspension comprises:
a second spring assembly, disposed about a second spring axis, and coupled to the second pivot arm.

11. The mobility vehicle of claim 1, wherein the first pivot arm comprises an anti-tip element.

12. The mobility vehicle of claim 11, wherein the first pivot arm is configured and dimensioned to cause the anti-tip element to move relative to a drive wheel axis when the first pivot arm pivots.

13. The mobility vehicle of claim 3, wherein each bridge of the plurality of bridges is disposed at an outermost point of the frame.

14. The mobility vehicle of claim 10, wherein the second pivot arm comprises:
a first substantially linear arm segment extending at least from a point at which the second pivot arm is coupled to the frame through a point at which the second pivot arm is coupled to the second spring assembly; and
a second arm segment extending from the linear arm segment to at least a castor stem axis.

15. The mobility vehicle of claim 10 wherein at least one of the first spring assembly and the second spring assembly comprises a spring disposed about co-axial damper.

16. The mobility vehicle of claim 8, wherein a center of gravity of the mobility vehicle is positioned approximately at a midpoint between a vertical line passing through the link.

17. The mobility vehicle of claim 11, wherein the first pivot arm is coupled to a gear box, and the gear box is coupled to a motor.

18. The mobility vehicle of claim 17, wherein the gear box includes an axle coupled to a drive wheel.

19. The mobility vehicle of claim 17, wherein the first pivot arm includes a first plate and a second plate, wherein:
   the first plate is configured to be coupled to the gear box; and
   the second plate is configured to be coupled to the anti-tip element.

* * * * *